(12) United States Patent
Kim et al.

(10) Patent No.: US 12,722,709 B2
(45) Date of Patent: *Sep. 1, 2026

(54) PLASTIC COMPOSITE MATERIAL PANEL AND MANUFACTURING METHOD THEREOF

(71) Applicants: Hyundai Motor Company, Seoul (KR); Kia Corporation, Seoul (KR)

(72) Inventors: Minsoo Kim, Suwon-si (KR); Joonghyun Shin, Hwaseong-si (KR); Yoonkyoung Han, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 306 days.

This patent is subject to a terminal disclaimer.

(21) Appl. No.: 18/362,432

(22) Filed: Jul. 31, 2023

(65) Prior Publication Data

US 2023/0373565 A1 Nov. 23, 2023

Related U.S. Application Data

(62) Division of application No. 17/468,000, filed on Sep. 7, 2021, now Pat. No. 11,760,419.

(30) Foreign Application Priority Data

Jan. 11, 2021 (KR) ........................ 10-2021-0003308

(51) Int. Cl.
*B62D 25/00* (2006.01)
*B29C 70/46* (2006.01)
(Continued)

(52) U.S. Cl.
CPC .............. *B62D 25/00* (2013.01); *B29C 70/46* (2013.01); *B62D 25/02* (2013.01); *B62D 25/08* (2013.01);
(Continued)

(58) Field of Classification Search
CPC ......... B29C 43/00; B29C 43/02; B29C 43/04; B29C 2043/046; B29C 2043/026;
(Continued)

(56) References Cited

U.S. PATENT DOCUMENTS 5,988,074 A 11/1999 Thoman
6,099,772 A * 8/2000 Hinzmann ................ B22F 3/03 264/109
(Continued)

FOREIGN PATENT DOCUMENTS

CN 1833941 A 9/2006
CN 103562054 A 2/2014
(Continued)

OTHER PUBLICATIONS

Machine Translation of Abe (JP2013001245A), Espacenet, 2013 (Generated Nov. 26, 2025) (Year: 2013).*

*Primary Examiner* — Andrew L Swanson
(74) *Attorney, Agent, or Firm* — Slater Matsil, LLP

(57) ABSTRACT

An embodiment includes a method of manufacturing a plastic composite material panel. A gel type plastic composite material is loaded onto a fixed die having a first molding surface of a flat shape for molding a material filling portion and a second molding surface for molding an outer plate portion. A first movable die having a third molding surface for molding the material filling portion and a fourth molding surface for molding the outer plate portion is combined with a second movable die having a molding groove for molding the material filling portion to the fixed die. The outer plate portion is formed by the second and fourth molding surfaces and the material filling portion is integrally formed with the outer plate portion by the first and third molding surfaces and the molding groove. The material filling portion is thicker than the outer plate portion.

20 Claims, 10 Drawing Sheets

(51) Int. Cl.

| | |
|---|---|
| ***B62D 25/02*** | (2006.01) |
| ***B62D 25/08*** | (2006.01) |
| ***B62D 27/02*** | (2006.01) |
| ***B62D 29/00*** | (2006.01) |
| ***B62D 29/04*** | (2006.01) |
| ***B62D 65/02*** | (2006.01) |
| *B29K 105/00* | (2006.01) |
| *B29L 31/30* | (2006.01) |

(52) U.S. Cl.
CPC ......... *B62D 27/026* (2013.01); *B62D 29/001* (2013.01); *B62D 29/043* (2013.01); *B62D 29/048* (2013.01); *B62D 65/024* (2013.01); *B29K 2105/0061* (2013.01); *B29L 2031/30* (2013.01); *B62D 29/041* (2013.01)

(58) Field of Classification Search
CPC ..... B29C 33/0088; B29C 70/46; B62D 25/00; B62D 25/02; B62D 25/08; B62D 27/026; B62D 29/001; B62D 29/043; B62D 29/048; B62D 65/024; B62D 29/041; B29K 2105/0061; B29L 2031/30
See application file for complete search history.

(56) References Cited

U.S. PATENT DOCUMENTS

| | | | | |
|---|---|---|---|---|
| 8,172,308 | B2 | 5/2012 | Schmidt et al. | |
| 8,511,742 | B2 | 8/2013 | Legler et al. | |
| 11,208,151 | B2 | 12/2021 | Dominic | |
| 11,760,419 | B2 * | 9/2023 | Kim | B29C 70/46 296/203.01 |
| 2003/0122405 | A1 | 7/2003 | Stallfort et al. | |
| 2006/0208539 | A1 | 9/2006 | Ludwig et al. | |
| 2009/0049886 | A1 * | 2/2009 | Okuzumi | B21D 24/04 72/475 |
| 2013/0285287 | A1 * | 10/2013 | Ko | B29D 22/04 264/319 |
| 2014/0084636 | A1 | 3/2014 | Wimmer et al. | |
| 2016/0318557 | A1 * | 11/2016 | Kim | B60R 9/04 |
| 2017/0036703 | A1 | 2/2017 | Maeda et al. | |
| 2017/0305046 | A1 * | 10/2017 | Fujisawa | B29C 44/02 |
| 2019/0001533 | A1 * | 1/2019 | Murphy | B29C 33/485 |
| 2020/0331215 | A1 * | 10/2020 | Santoni | B29C 43/361 |

FOREIGN PATENT DOCUMENTS

| | | | |
|---|---|---|---|
| CN | 107010119 | A | 8/2017 |
| CN | 208360178 | U | 1/2019 |
| CN | 209852436 | U | 12/2019 |
| CN | 110696926 | A | 1/2020 |
| DE | 3124975 | A1 | 1/1983 |
| JP | S6218369 | A | 1/1987 |
| JP | S62194980 | A | 8/1987 |
| JP | H09254815 | A | 9/1997 |
| JP | 2009220651 | A | 10/2009 |
| JP | 2013001245 | A * | 1/2013 |
| JP | 2016210398 | A | 12/2016 |
| KR | 20050037265 | A | 4/2005 |
| WO | 2009004753 | A1 | 1/2009 |

* cited by examiner

PLASTIC COMPOSITE MATERIAL PANEL AND MANUFACTURING METHOD THEREOF

CROSS-REFERENCE TO RELATED APPLICATIONS

This application is a divisional of U.S. application Ser. No. 17/468,000, filed on Sep. 7, 2021, which claims the benefit of Korean Patent Application No. 10-2021-0003308, filed in the Korean Intellectual Property Office on Jan. 11, 2021, which applications are hereby incorporated herein by reference.

This application is related to U.S. application Ser. No. 17/957,301, filed on Sep. 30, 2022, which claims the benefit of Korean Patent Application No. 10-2021-0161014, filed Nov. 22, 2021 and to U.S. application Ser. No. 17/988,911, filed on Nov. 17, 2022, which claims the benefit of Korean Patent Application No. 10-2021-0161013, filed Nov. 22, 2021, which applications are hereby incorporated herein by reference.

TECHNICAL FIELD

An embodiment of the present invention relates to a plastic composite material panel and a manufacturing method thereof.

BACKGROUND

Recently, the vehicle industry has been introducing a new concept of future mobility vision for realizing a human-centered and dynamic future city. One of these future mobility solutions is a purpose built vehicle (PBV) as purpose-based mobility.

The PBV is an environment-friendly mobility solution that provides a customized service for passengers during a period in which they travel on the ground to their destination, and it may use electric vehicle (EV)-based artificial intelligence to set an optimal route for each situation and may also group-drive.

A vehicle body of the PBV includes an under body (referred to as a rolling chassis or skateboard in the art) and an upper body mounted on the under body. Here, the upper body may be configured of a space frame.

The upper body, in order to reduce a weight of the vehicle body, includes a vehicle body frame made of an aluminum or steel material, and a plastic composite material panel bonded to the body frame with an adhesive.

Such a plastic composite material panel is manufactured by molding the plastic composite original material into a shape set through a mold. However, in the prior art, a bent shape portion (undercut portion) of the plastic composite material panel is caught in a molding part of the mold, and thus there is a problem that the plastic composite material panel may not be smoothly taken out from the mold.

The above information disclosed in this Background section is only for enhancement of understanding of the background of the invention, and therefore it may contain information that does not form the prior art that is already known to a person of ordinary skill in the art.

SUMMARY

An embodiment of the present invention relates to a plastic composite material panel and a manufacturing method thereof. Particular embodiments relate to a plastic composite material panel bonded to a vehicle body of a purpose built vehicle (PBV) and a manufacturing method thereof.

Embodiments of the present invention provide a plastic composite material panel and a manufacturing method thereof that may provide excellent moldability and prevent a cross-section of a vehicle body frame from being reduced.

An embodiment of the present invention provides a plastic composite material panel including (i) an outer plate portion bent in a predetermined shape and bonded to a vehicle body frame through an adhesive, and (ii) a material filling portion integrally formed with the outer plate portion and thicker than the outer plate portion.

The plastic composite material panel may further include a first bonding flange integrally formed with a lower portion of the outer plate portion and bonded to a first flange portion extending from a body portion of the vehicle body frame through an adhesive.

A second bonding flange may be integrally formed with the material filling portion.

The second bonding flange may be bonded to a second flange portion extending from the body portion of the vehicle body frame through an adhesive.

The outer plate portion and the material filling portion may be configured of a side outer panel that is able to be bonded to the vehicle body frame through an adhesive.

A roof panel flange portion made of a plastic composite material may be joined to the second bonding flange through an adhesive.

The material filling portion may be bonded to the body portion of the vehicle body frame through an adhesive.

The material filling portion may be bonded to a protruding surface extending upward from the body portion of the vehicle body frame through an adhesive.

The material filling portion may be connected through a seal strip to a roof panel flange portion bonded to the second flange portion extending from the body portion of the vehicle body frame through an adhesive.

Another embodiment of the present invention provides a manufacturing method of a plastic composite material panel bonded to a vehicle body frame including (a) providing a gel type of plastic composite material, (b) loading the gel type of plastic composite material onto a fixed die having a first molding surface of a flat shape for molding a material filling portion and a second molding surface for molding an outer plate portion, (c) combining a first movable die having a third molding surface for molding the material filling portion and a fourth molding surface for molding the outer plate portion and a second movable die having a molding groove for molding the material filling portion to the fixed die, (d) forming the outer plate portion by the second and fourth molding surfaces, and integrally forming the material filling portion thicker than the outer plate portion with the outer plate portion by the first and third molding surfaces and the molding groove.

The manufacturing method of the plastic composite material panel may further include (e) releasing the first and second movable dies from the fixed die and taking out the plastic composite material panel.

In the (e) step, the plastic composite material panel may be taken out through the first molding surface in a moving direction of the first movable die.

According to the embodiments of the present invention, it is possible to increase moldability of a plastic composite material panel, to secure a quality of the plastic composite material panel, to secure a mounting space of a roof panel and the like, and to expand a cross-section of a vehicle body frame.

In addition, effects that may be obtained or expected from embodiments of the present invention are directly or suggestively described in the following detailed description. That is, various effects expected from embodiments of the present invention will be described in the following detailed description.

BRIEF DESCRIPTION OF THE DRAWINGS

These drawings are for reference only in describing exemplary embodiments of the present invention, and therefore, the technical idea of the present invention should not be limited to the accompanying drawings.

Figure 1:
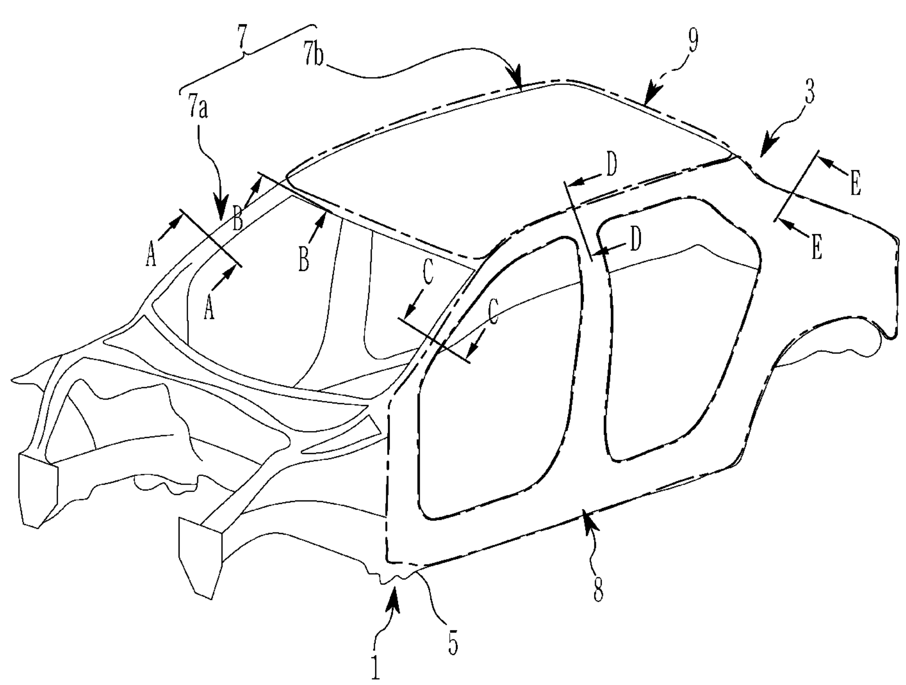
FIG. 1 illustrates an example of a vehicle body applied to an embodiment of the present invention.

The following elements may be used in connection with the drawings to describe embodiments of the present invention.

| | |
|---|---|
| 1: under body | 3: upper body |
| 5: chassis frame | 7: vehicle body frame |
| 7a: front body portion | 7b: rear body portion |
| 7c: protruding surface | 7d: rear extension member |
| 7e: panel mounting surface | 8: side outer panel |
| 9: roof panel | 9a: roof panel flange portion |
| 10: outer plate portion | 11: first bonding flange |
| 30: material filling portion | 31: second bonding flange |
| 41: adhesive | 51: first flange portion |
| 52: second flange portion | 61: windshield glass |
| 71: gel type plastic composite material | 81: fixed die |
| 82: first molding surface | 83: second molding surface |
| 84: first movable die | 85: second movable die |
| 86: third molding surface | 87: fourth molding surface |
| 88: first molding groove | 89: second molding groove |
| 91: seal strip | |
| 100, 200: plastic composite material panel | |

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

Further, in the following detailed description, terms of elements, which are in the same relationship, are divided into "the first," "the second," etc., but the present invention is not necessarily limited to the order in the following description.

Throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit," " . . . means," " . . . part," " . . . portion," and " . . . member" described in the specification mean a unit of a comprehensive configuration having at least one function or operation.

FIG. 1 illustrates an example of a vehicle body applied to an embodiment of the present invention.

Referring to FIG. 1, a plastic composite material panel 100 according to an embodiment of the present invention may be applied to a vehicle body of, for example, an electric vehicle-based purpose built vehicle (PBV).

Here, the PBV may be an environment-friendly vehicle that provides a customized service required for an occupant during a time it takes to travel on the ground to a destination. The PBV may set the optimal path for each situation, enable group driving, and furthermore, may be a box-type of vehicle with a large interior space.

The vehicle body of the PBV may include an under body 1 of a skateboard type and an upper body 3 as a monocoque type of vehicle body mounted on the under body 1.

The under body 1 is also referred to as a rolling chassis in the art, and may include a chassis frame 5 on which a battery assembly (not shown in the drawing) may be mounted.

In addition, the upper body 3 is a body coupled onto the under body 1, and may include a vehicle body frame 7 forming a cabin. The upper body 3 may be, for example, a space frame in which a frame is formed by connecting a plurality of members such as a steel plate or a pipe.

In the art, a vehicle width direction (full width direction) is referred to as an L direction, a vehicle body length direction (front/rear direction or full length direction of a vehicle body) is referred to as a T direction, and a height direction of a vehicle body is referred to as an H direction. However, in the embodiment of the present invention, instead of setting the L, T, and H directions as described above as the reference directions, the following constituent elements will be described by setting the reference directions to a vehicle width direction, a vehicle body front/rear direction, and a vertical direction.

In addition, hereinafter, an end (one side end or the other end) may be defined as any one end, or may be defined as a predetermined portion (one end portion or the other end portion) including the end.

On the other hand, the vehicle body frame 7 of the upper body 3 is formed by connecting frames made of a steel or aluminum material, and may include a side inner mounted on both sides of the chassis frame 5 of the under body 1 and a roof rail connected to the side inner portion.

In the vehicle body frame 7, the plastic composite material panel 100 according to the embodiment of the present invention is bonded to a side surface thereof, and a roof panel 9 made of a plastic composite material is bonded to an upper surface thereof. Hereinafter, a body portion positioned at the front in the vehicle body frame 7 is referred to as a front body portion 7*a*, and a body portion positioned at the rear therein is referred to as a rear body portion 7*b*.

The plastic composite material is a reinforcing material impregnated with a resin in a fiber material, and may be molded into a predetermined shape by a mold. Further, the plastic composite material may be one of fiber reinforced plastic (FRP), carbon fiber reinforced plastic (CFRP), and glass fiber reinforced plastic (GFRP).

The plastic composite material panel 100 according to the embodiment of the present invention may be configured of a side outer panel 8 bonded to the vehicle body frame 7 through an adhesive. The plastic composite material panel 100 has good moldability, and has a structure that may prevent the cross-section of the vehicle body frame 7 from being reduced.

Figure 2:
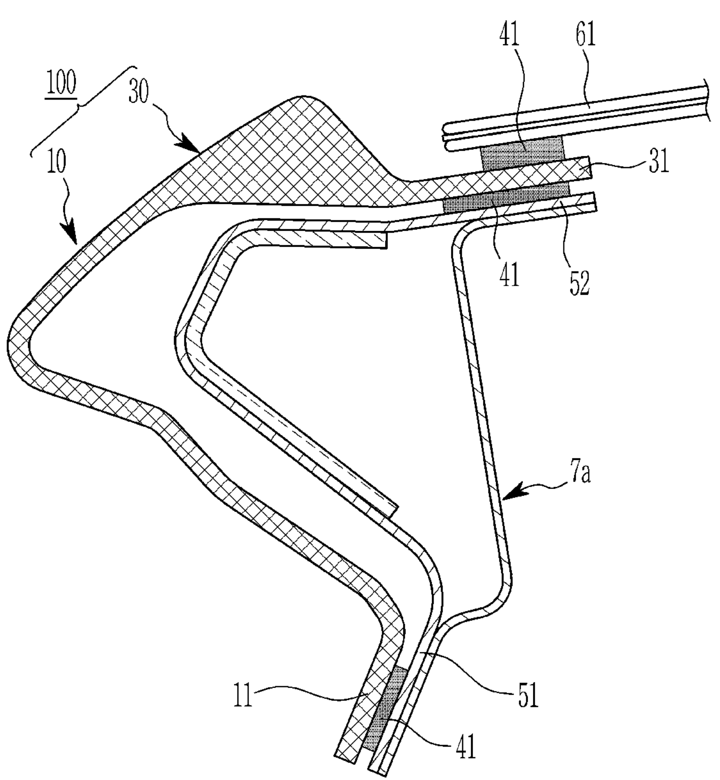
FIG. 2 illustrates a cross-sectional view taken along line A-A of FIG. 1 illustrating a plastic composite material panel according to an embodiment of the present invention.

FIG. 2 illustrates a cross-sectional view taken along line A-A of FIG. 1 illustrating a plastic composite material panel according to an embodiment of the present invention.

Referring to FIG. 2, the plastic composite material panel 100 according to the embodiment of the present invention includes an outer plate portion 10, and a material filling portion 30.

In the embodiment of the present invention, the outer plate portion 10 is a portion bonded through an adhesive 41 to an outer side of the vehicle body frame 7, and is molded into a bent shape corresponding to an outer of the vehicle body frame 7.

A first bonding flange 11 integrally formed with the outer plate portion 10 is formed under the outer plate portion 10. The first bonding flange 11 is bonded to a first flange portion 51 extending from the front body portion 7*a* of the vehicle body frame 7 through the adhesive 41.

In the embodiment of the present invention, the material filling portion 30 is thicker than the outer plate portion 10, and is integrally formed with the outer plate portion 10. Further, the material filling portion 30 is integrally formed with the outer plate portion 10 at an upper portion of the outer plate portion 10 based on the drawing.

The material filling portion 30 is a portion in which a fiber material is stacked in a predetermined shape on a surface of the outer plate portion 10 based on the surface thereof, and is provided in a rounded shape in the surface of the outer plate portion 10.

A second bonding flange 31 having the same thickness as the outer plate portion 10 is integrally formed with the material filling portion 30. The second bonding flange 31 is bonded to a second flange portion 52 extending from the front body portion 7*a* of the vehicle body frame 7 through the adhesive 41. An edge portion of a windshield glass 61 may be bonded to the second bonding flange 31 through the adhesive 41.

Figure 3:
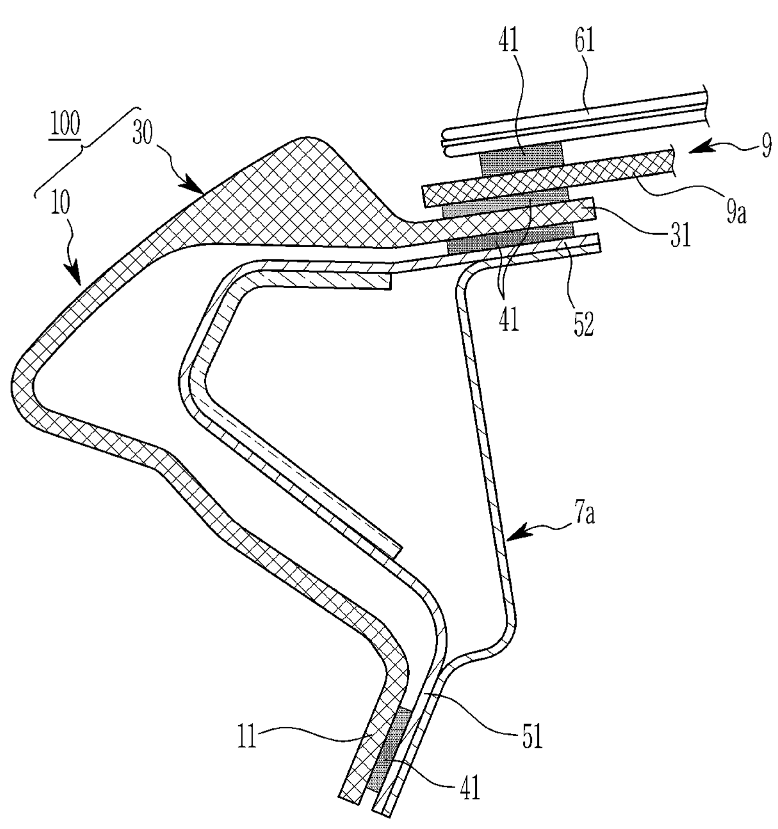
FIG. 3 illustrates a cross-sectional view taken along line B-B of FIG. 1 illustrating a plastic composite material panel according to an embodiment of the present invention.

Meanwhile, as shown in FIG. 3, a flange portion 9*a* of the roof panel 9 mentioned above may be bonded to the second bonding flange 31 through the adhesive 41. In addition, the edge portion of the windshield glass 61 may be bonded to the flange portion 9*a* of the roof panel 9 through the adhesive 41.

Hereinafter, a manufacturing method of the plastic composite material panel 100 according to an embodiment of the present invention configured as described above will be described with reference to the accompanying drawings.

Figure 4:
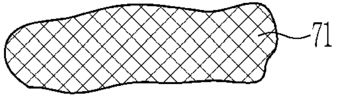
FIG. 4 to FIG. 6 are drawings for explaining a manufacturing method of a plastic composite material panel according to an embodiment of the present invention.
Figure 5:
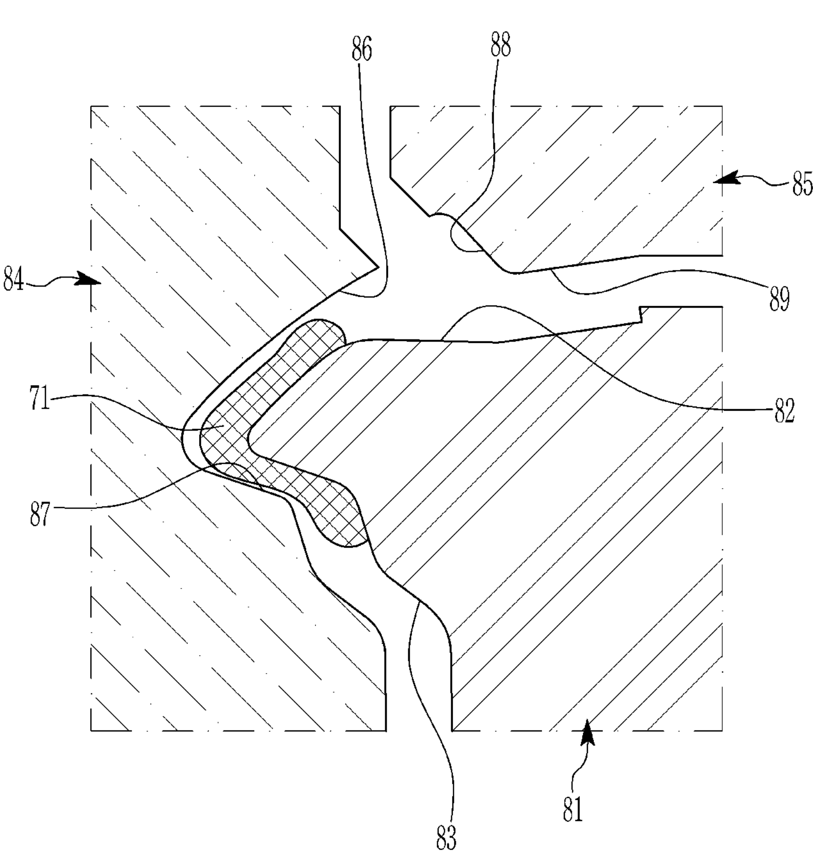
Figure 6:
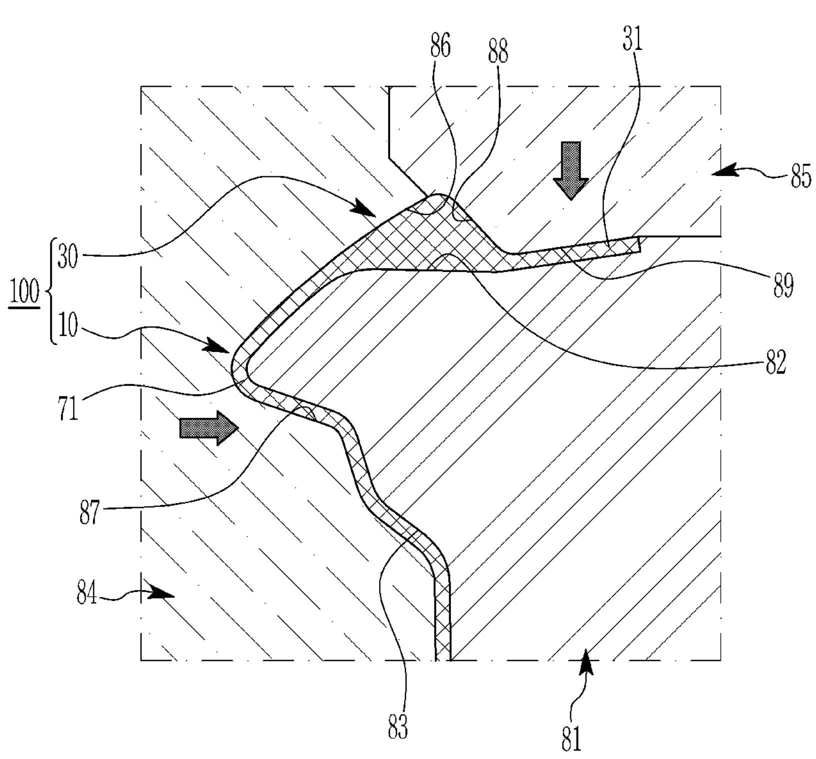

FIG. 4 to FIG. 6 are drawings for explaining a manufacturing method of a plastic composite material panel according to an embodiment of the present invention.

Referring to FIG. 4, first, an embodiment of the present invention provides a gel-type plastic composite material 71 made of a fiber material.

In addition, as shown in FIG. 5, the gel-type plastic composite material 71 is loaded on a fixed die 81.

Here, the fixed die 81 includes a first molding surface 82 having a flat shape for forming the material filling portion 30, and a second molding surface 83 for forming the outer plate portion 10.

Next, as shown in FIG. 6, first and second movable dies 84 and 85 are combined with the fixed die 81, and the gel-type plastic composite material 71 is pressed.

The first movable die 84 includes a third molding surface 86 for forming the material filling portion 30, and a fourth molding surface 87 for forming the outer plate portion 10.

In addition, the second movable die 85 includes a first molding groove 88 for forming the material filling portion 30, and a second molding groove 89 for forming the second bonding flange 31.

Therefore, in the embodiment of the present invention, the outer plate portion 10 may be molded by the second and fourth molding surfaces 83 and 87, and by the first and third molding surfaces 82 and 86 and the first molding groove 88, the material filling portion 30 thicker than the outer plate portion 10 may be molded in the plastic composite material panel 100 integrally formed with the outer plate portion 10.

In the embodiment of the present invention, the second bonding flange 31 integrally connected to the material filling portion 30 may be molded in the plastic composite material panel 100 by the second molding groove 89 of the second movable die 85 and the first molding surface 82 of the fixed die 81.

In the state of molding the plastic composite material panel 100 as described above, in the embodiment of the present invention, the first and second movable dies 84 and 85 are released from the fixed die 81, and the plastic composite material panel 100 is taken out.

In the embodiment of the present invention, the plastic composite material panel 100 may be taken out along a moving direction of the first movable die 84 through the first molding surface 82 of the fixed die 81.

In this case, in the embodiment of the present invention, since no undercut is formed in the plastic composite material panel 100 by integrally molding the above-mentioned material filling portion 30 to the outer plate portion 10, the plastic composite material panel 100 may be smoothly taken out through the first molding surface 82 of the fixed die 81.

The plastic composite material molding mold including the fixed die 81, the first movable die 84, and the second movable die 85 as described above consists of a mold device of a known technology for molding a plastic composite material panel of a predetermined shape, so a more detailed description will be omitted herein.

According to the plastic composite material panel 100 according to the embodiment of the present invention as described so far, it is integrally formed in the outer plate portion 10, and includes the material filling portion 30 that is thicker than the outer plate portion 10.

Therefore, in the embodiment of the present invention, the plastic composite material panel 100 may be easily taken out from the mold during the molding process of the plastic composite material panel 100 through the mold. Therefore, according to the embodiment of the present invention, it is possible to increase the moldability of the plastic composite material panel 100, and to secure the quality of the plastic composite material panel 100.

In addition, according to the embodiment of the present invention, as the material filling portion 30 is integrally formed with the outer plate portion 10, when considering the thickness increase and the adhesive thickness compared to a steel or aluminum material, it is possible to secure a mounting space for the roof panel and the windshield glass without reducing the cross-section of the vehicle body frame 7.

Therefore, according to the embodiment of the present invention, since it is not necessary to reduce the cross-section of the vehicle body frame 7, it is possible to prevent deterioration of a vehicle front, an offset, and small overlap collision performance.

Figure 7:
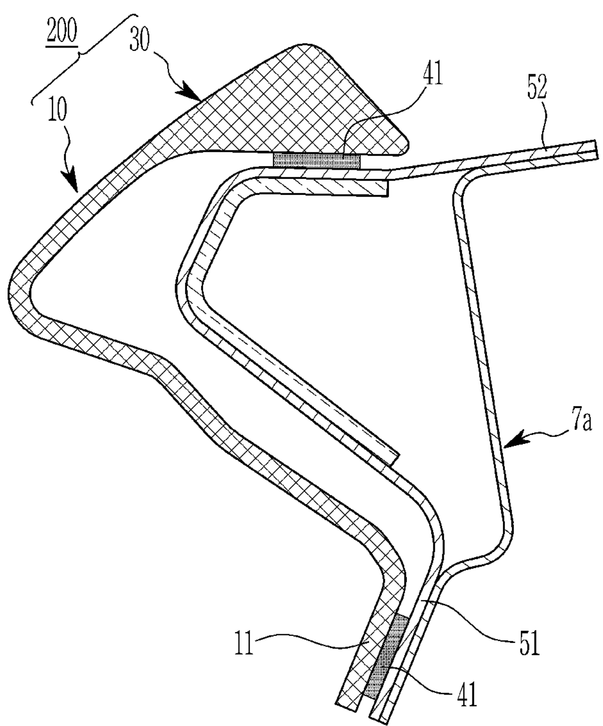
FIG. 7 illustrates a cross-sectional view taken along line C-C of FIG. 1 illustrating a plastic composite material panel according to another embodiment of the present invention.

FIG. 7 illustrates a cross-sectional view taken along line C-C of FIG. 1 illustrating a plastic composite material panel according to another embodiment of the present invention. In the drawing, the same reference numerals are denoted to the same components as in the above embodiment.

Referring to FIG. 7, in a plastic composite material panel 200 according to another embodiment of the present invention, the second bonding flange 31 described above in the previous embodiment is removed, and the material filling portion 30 bonded to the front body portion 7*a* of the vehicle body frame 7 may be formed.

The first bonding flange 11 of the outer plate portion 10 is bonded to the first flange portion 51 of the front body portion 7*a* through the adhesive 41. In addition, the material filling portion 30 according to the embodiment of the present invention is bonded to the front body portion 7*a* of the vehicle body frame 7 through the adhesive 41.

The flange portion of the roof panel and the edge portion of the windshield glass, while not shown in the drawing, may be bonded to the second flange portion 52 of the front body portion 7*a* through an adhesive.

Therefore, in another embodiment of the present invention, by configuring the material filling portion 30 of a flangeless type, it is possible to secure the mounting space of the roof panel and the windshield glass for the vehicle body frame 7.

Figure 8:
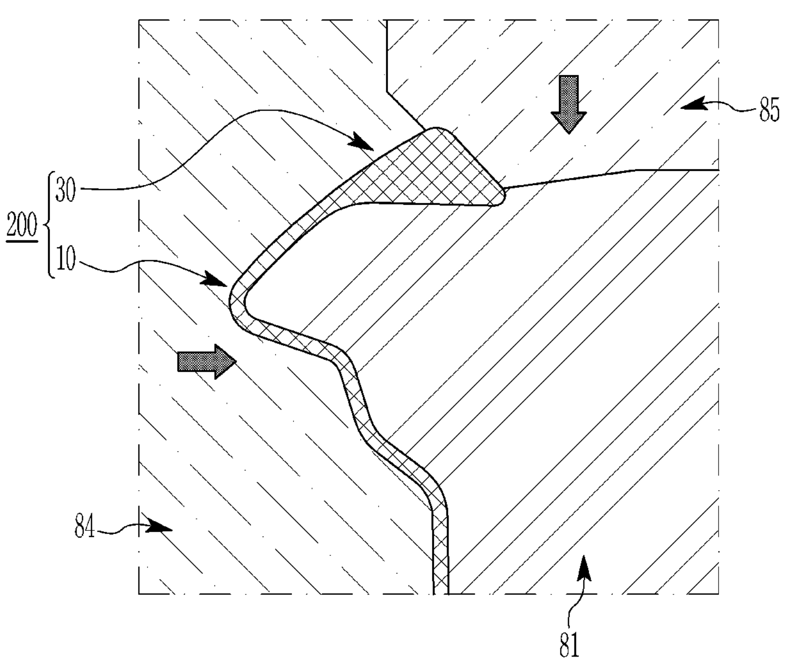
FIG. 8 illustrates a mold for molding a plastic composite material panel according to another embodiment of the present invention.

On the other hand, the plastic composite material panel 200 in which the flangeless type of the material filling portion 30 is formed on the outer plate portion 10 as described above may be molded through a plastic composite material molding mold including, as shown in FIG. 8, the fixed die 81, the first movable die 84, and the second movable die 85.

The plastic composite material molding mold basically includes the constituent elements described in the previous embodiment, and the molding groove portion for forming the second bonding flange described in the previous embodiment on the fixed die 81 and the second movable die 85 is removed.

Figure 9:
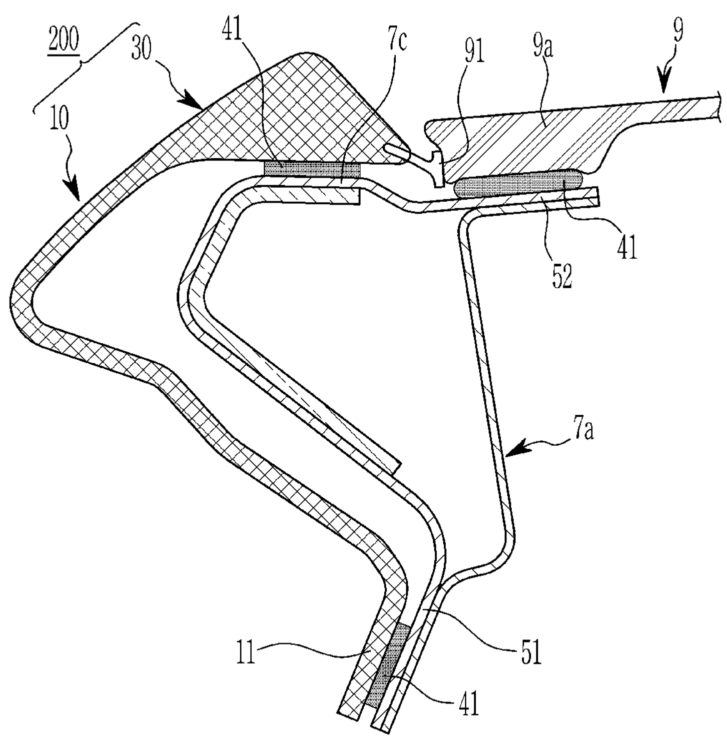
FIG. 9 illustrates a cross-sectional view taken along line D-D of FIG. 1 illustrating a plastic composite material panel according to another embodiment of the present invention.

FIG. 9 illustrates a cross-sectional view taken along line D-D of FIG. 1 illustrating a plastic composite material panel according to another embodiment of the present invention. In the drawing, the same reference numerals are denoted to the same components as in the above embodiment.

Referring to FIG. 9, the plastic composite material panel 200 according to another embodiment of the present invention may include the material filling portion 30 bonded to a protruding surface 7*c* extending upward from the front body portion 7*a* of the vehicle body frame 7.

Here, the first bonding flange 11 of the outer plate portion 10 is bonded to the first flange portion 51 of the front body portion 7*a* through the adhesive 41. In addition, the material filling portion 30 is bonded to the protruding surface 7*c* of the front body portion 7*a* through the adhesive 41. Therefore, in the embodiment of the present invention, by bonding the material filling portion 30 to the protruding surface 7*c* of the front body portion 7*a*, it is possible to increase the cross-section of the vehicle body frame 7.

Further, the flange portion 9*a* of the roof panel 9 may be bonded to the second flange portion 52 of the front body portion 7*a* through the adhesive 41. The flange portion 9*a* of the roof panel 9 is connected to the material filling portion 30 through a seal strip 91. Accordingly, in the embodiment of the present invention, it is possible to secure the thickness of the flange portion 9*a* while securing the mounting space of the roof panel 9.

Figure 10:
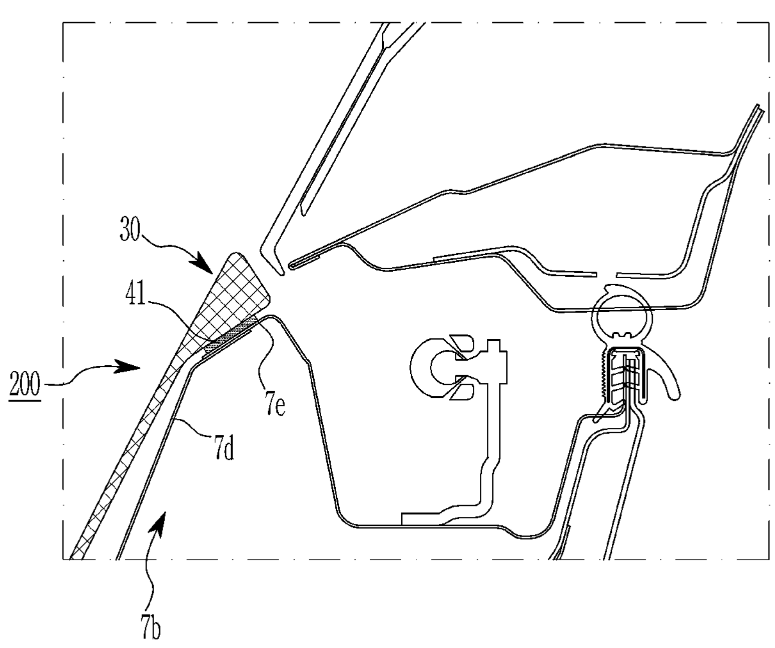
FIG. 10 illustrates a cross-sectional view taken along line E-E of FIG. 1 illustrating a plastic composite material panel according to another embodiment of the present invention.

FIG. 10 illustrates a cross-sectional view taken along line E-E of FIG. 1 illustrating a plastic composite material panel according to another embodiment of the present invention. In the drawing, the same reference numerals are denoted to the same components as in the above embodiment.

Referring to FIG. 10, the plastic composite material panel 200 according to another embodiment of the present invention may include the material filling portion 30 bonded to the rear body portion 7*b* of the vehicle body frame 7.

Here, the rear body portion 7*b* may include a rear extension member 7*d*. A panel mounting surface 7*e* is formed on an upper portion of the rear body portion 7*b*. In the embodiment of the present invention, the material filling portion 30 is bonded to the panel mounting surface 7*e* through the adhesive 41.

Accordingly, in the embodiment of the present invention, a loading property of the plastic composite material panel 200 may be secured by bonding the material filling portion 30 to the panel mounting surface 7*e* of the rear body portion 7*b*.

The remaining configuration and effect of the plastic composite material panel 200 according to another embodiment of the present invention as described above are the same as the previous embodiment, so a detailed description thereof will be omitted.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method of a plastic composite material panel, comprising:

loading a plastic composite material onto a fixed die having a first molding surface of a flat shape for molding a material filling portion and a second molding surface for molding an outer plate portion, the plastic composite material having properties of a gel;

combining a first movable die having a third molding surface for molding the material filling portion and a fourth molding surface for molding the outer plate portion and a second movable die having a molding groove for molding the material filling portion to the fixed die;

forming the outer plate portion by the second and fourth molding surfaces; and integrally forming the material filling portion with the outer plate portion by the first and third molding surfaces and the molding groove, wherein the material filling portion is thicker than the outer plate portion.

2. The method of claim 1, further comprising:

releasing the first and second movable dies from the fixed die; and taking out the plastic composite material panel.

3. The method of claim 2, wherein taking out the plastic composite material panel comprises taking out the plastic composite material panel through the first molding surface in a moving direction of the first movable die.

4. The method of claim 1, further comprising adhesively bonding the outer plate portion to a vehicle body frame.

5. The method of claim 4, further comprising adhesively bonding a bonding flange that is integrally formed with a lower portion of the outer plate portion to a first flange portion extending from a body portion of the vehicle body frame.

6. The method of claim 5, further comprising adhesively bonding a second bonding flange that is integrally formed with the material filling portion to a second flange portion extending from the body portion of the vehicle body frame.

7. The method of claim 6, further comprising adhesively bonding a roof panel flange portion to the second bonding flange, the roof panel flange portion comprising a plastic composite material.

8. The method of claim 1, wherein the outer plate portion and the material filling portion form a side outer panel, the method further comprising adhesively bonding the side outer panel to a vehicle body frame.

9. The method of claim 1, further comprising adhesively bonding the material filling portion to a body portion of a vehicle body frame.

10. The method of claim 9, wherein the outer plate portion and the material filling portion form a side outer panel, the method further comprising:

bonding the side outer panel to the vehicle body frame; and bonding the material filling portion to a protruding surface extending upward from the body portion of the vehicle body frame.

11. The method of claim 10, further comprising connecting the material filling portion through a seal strip to a roof panel flange portion bonded to a second flange portion extending from the body portion of the vehicle body frame.

12. A method of manufacturing a vehicle, the method comprising:

forming a vehicle body frame comprising a front body portion and a rear body portion;

forming a plastic composite material panel comprising an outer plate portion bent in a predetermined shape, a material filling portion that is thicker than the outer plate portion and integrally formed with an upper portion of the outer plate portion, and a first bonding flange integrally formed with a lower portion of the outer plate portion;

adhesively bonding the outer plate portion to the vehicle body frame; and adhesively bonding the first bonding flange to a first flange portion extending from the front body portion of the vehicle body frame;

wherein the plastic composite material panel is formed by:

loading a plastic composite material onto a fixed die having a first molding surface of a flat shape for molding a material filling portion and a second molding surface for molding an outer plate portion, the plastic composite material having properties of a gel;

combining a first movable die having a third molding surface for molding the material filling portion and a fourth molding surface for molding the outer plate portion and a second movable die having a molding groove for molding the material filling portion to the fixed die;

forming the outer plate portion by the second and fourth molding surfaces; and integrally forming the material filling portion with the outer plate portion by the first and third molding surfaces and the molding groove.

13. The method of claim 12, wherein the plastic composite material panel is further formed by:

releasing the first and second movable dies from the fixed die; and taking out the plastic composite material panel.

14. The method of claim 13, wherein taking out the plastic composite material panel comprises taking out the plastic composite material panel through the first molding surface in a moving direction of the first movable die.

15. The method of claim 12, wherein the plastic composite material further comprises a second bonding flange integrally formed with the material filling portion, the method further comprising adhesively bonding the second bonding flange to a second flange portion extending from the front body portion of the vehicle body frame.

16. The method of claim 15, further comprising adhesively bonding a roof panel flange portion to the second bonding flange.

17. The method of claim 15, further comprising adhesively bonding an edge portion of a windshield glass to the second bonding flange.

18. The method of claim 12, further comprising adhesively bonding the material filling portion to the front body portion of the vehicle body frame.

19. The method of claim 12, wherein the plastic composite material panel is a side outer panel, the method further comprising:

bonding the plastic composite material panel to the vehicle body frame; and bonding the material filling portion to a protruding surface extending upward from the front body portion of the vehicle body frame.

20. The method of claim 19, further comprising connecting the material filling portion through a seal strip to a roof panel flange portion bonded to a second flange portion extending from the front body portion of the vehicle body frame.

* * * * *